United States Patent
Chen et al.

(10) Patent No.: US 9,843,188 B2
(45) Date of Patent: Dec. 12, 2017

(54) METHOD TO SELECT OPTIMAL SYNCHRONIZATION SOURCE IN A MULTIPLE UNINTERRUPTIBLE POWER SUPPLY SYSTEM

(71) Applicant: Liebert Corporation, Columbus, OH (US)

(72) Inventors: Xian Chen, Columbus, OH (US); Brian P. Heber, Deleware, OH (US)

(73) Assignee: Liebert Corporation, Columbus, OH (US)

( * ) Notice: Subject to any disclaimer, the term of this patent is extended or adjusted under 35 U.S.C. 154(b) by 461 days.

(21) Appl. No.: 14/529,190

(22) Filed: Oct. 31, 2014

(65) Prior Publication Data
US 2015/0137604 A1 May 21, 2015

Related U.S. Application Data

(60) Provisional application No. 61/905,309, filed on Nov. 18, 2013.

(51) Int. Cl.
*H02J 7/00* (2006.01)
*H02J 9/00* (2006.01)
(Continued)

(52) U.S. Cl.
CPC ............... *H02J 3/08* (2013.01); *H02J 3/005* (2013.01); *H02J 3/40* (2013.01); *H02J 9/00* (2013.01);
(Continued)

(58) Field of Classification Search
None
See application file for complete search history.

(56) References Cited

U.S. PATENT DOCUMENTS

| | | | | |
|---|---|---|---|---|
| 5,612,580 A | * | 3/1997 | Janonis | H02J 9/062 307/64 |
| 6,191,500 B1 | * | 2/2001 | Toy | H02J 3/46 307/64 |

(Continued)

FOREIGN PATENT DOCUMENTS

EP       1788688 A2     5/2007

OTHER PUBLICATIONS

International Search Report and Written Opinion of the International Search Authority for PCT/US2014/063382, dated Feb. 9, 2015.

*Primary Examiner* — Jared Fureman
*Assistant Examiner* — Esayas Yeshaw
(74) *Attorney, Agent, or Firm* — Harness, Dickey & Pierce, P.L.C.

(57) ABSTRACT

A multiple uninterruptible power supply system includes at least two uninterruptible power supply modules. Each uninterruptible power supply module has a control unit with the control unit coupled to a synchronization bus. The uninterruptible power supply module are synchronized to each other with one of the uninterruptible power supply modules being operated as a sync master UPS and its control unit sending synchronization signals on the synchronization bus that are received on the synchronization bus by control units of each of the other uninterruptible power supply module which are each operated as a slave UPS synchronized to the sync master UPS. When a bypass power source for the uninterruptible power supply module that is being operated as the sync master becomes unqualified, another one of the UPS modules is operated as the sync master and its control unit then sends out the synchronization signals.

8 Claims, 8 Drawing Sheets

(51) Int. Cl.
*H02J 3/08* (2006.01)
*H02J 3/00* (2006.01)
*H02J 3/40* (2006.01)
*H02J 9/06* (2006.01)

(52) U.S. Cl.
CPC .............. *H02J 9/062* (2013.01); *Y02P 80/14* (2015.11); *Y02P 80/152* (2015.11); *Y10T 307/62* (2015.04)

(56) References Cited

U.S. PATENT DOCUMENTS

| | | | |
|---|---|---|---|
| 2003/0048006 A1* | 3/2003 | Shelter, Jr. | H02J 9/061 307/64 |
| 2005/0043859 A1* | 2/2005 | Tsai | H02J 3/46 700/286 |
| 2006/0043793 A1* | 3/2006 | Hjort | H02J 9/062 307/1 |
| 2006/0043797 A1* | 3/2006 | Hjort | H02J 7/0047 307/46 |
| 2006/0167569 A1* | 7/2006 | Colombi | H02J 3/005 700/22 |
| 2008/0034256 A1* | 2/2008 | Mosman | H02J 9/06 714/43 |
| 2011/0278934 A1* | 11/2011 | Ghosh | H02J 9/062 307/66 |
| 2012/0306274 A1* | 12/2012 | Shetler, Jr. | H02J 9/062 307/64 |
| 2013/0069432 A1* | 3/2013 | Beg | H02J 9/06 307/64 |
| 2013/0069667 A1 | 3/2013 | Beg | |
| 2013/0193760 A1* | 8/2013 | Colombi | H02J 9/062 307/64 |
| 2014/0167517 A1* | 6/2014 | Kinoshita | H02J 9/062 307/87 |

* cited by examiner

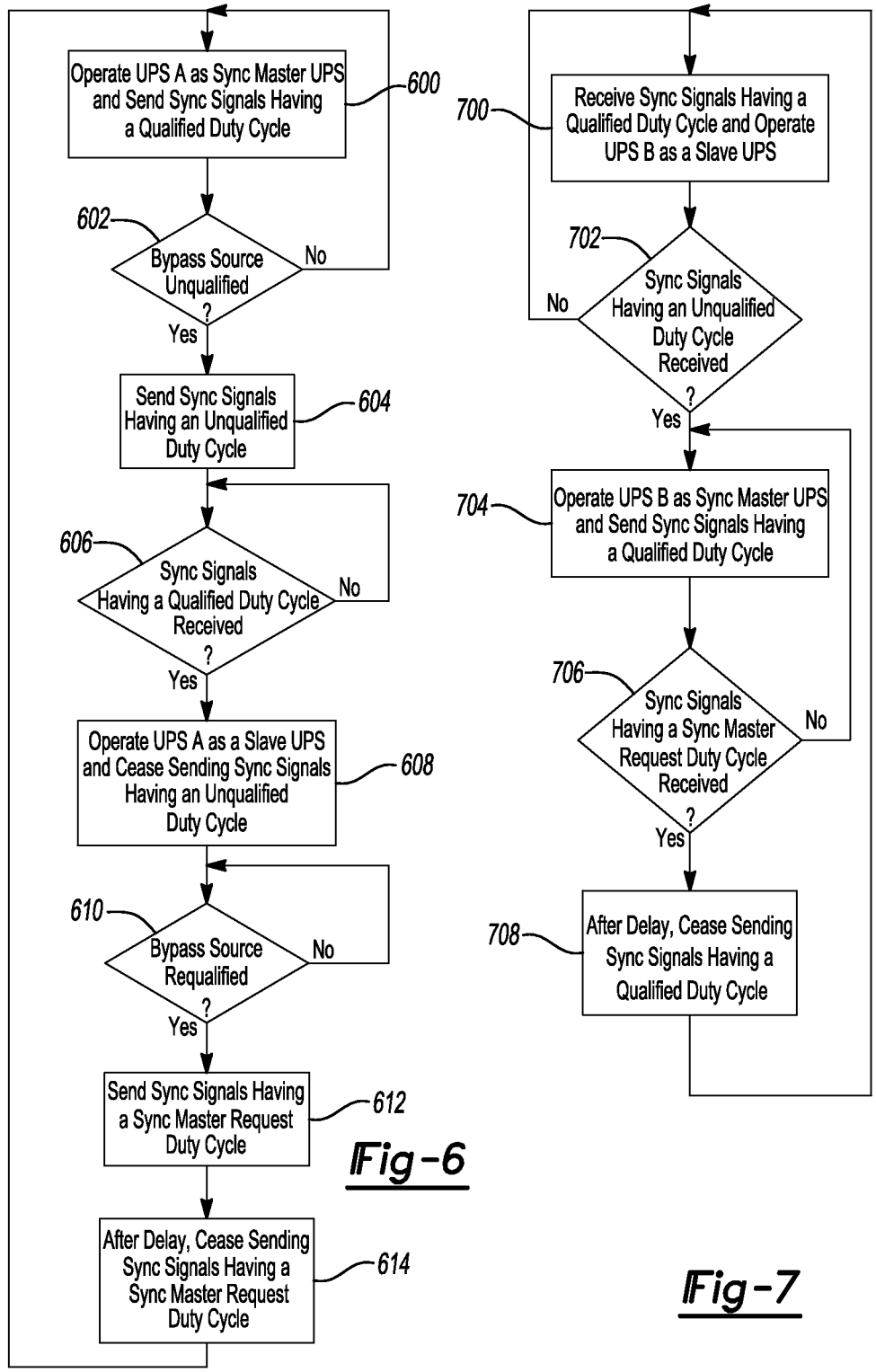

METHOD TO SELECT OPTIMAL SYNCHRONIZATION SOURCE IN A MULTIPLE UNINTERRUPTIBLE POWER SUPPLY SYSTEM

CROSS-REFERENCE TO RELATED APPLICATIONS

This application claims the benefit of U.S. Provisional Application No. 61/905,309, filed on Nov. 18, 2013. The entire disclosure of the above application is incorporated herein by reference.

FIELD

The present disclosure relates to a method to select an optimal synchronization source in an uninterruptible power supply system.

BACKGROUND

This section provides background information related to the present disclosure which is not necessarily prior art.

FIG. 1 shows an example of a prior art single module uninterruptible power supply ("UPS") system 100, which is referred to herein as a UPS module 100. The basic elements of this UPS module are a rectifier 102, an inverter 104, a back-up DC power source 106 (a battery in this case), a control unit 108 and a bypass switch 110. An input 112 of rectifier 102 is coupled to a rectifier power source 114 and an output 116 of rectifier 102 is coupled to a DC bus 118. DC bus 118 is coupled to an input 120 of inverter 104 and to back-up DC power source 106. An output 122 of inverter 104 is coupled to a load (or loads) 124 that are powered by UPS module 100. An input 126 of bypass switch 110 is coupled to a bypass power source 128 and an output 130 of bypass switch 110 is coupled to the output 122 of inverter 104. UPS module 100 may also include an output transformer (not shown) coupled between the output 122 of inverter 104 and load 124. Under normal operating conditions the output voltage of the inverter 104 is synchronized by the control unit 108 to the voltage of bypass power source 128, as shown in FIG. 2. That is, the output voltage of inverter 104 is controlled so that it is in phase with the voltage of bypass power source 128. When the bypass power source 128 is not qualified, for example goes to zero volts, the inverter 104 will output a voltage that is at a nominal frequency of bypass power source 128 but not locked in phase to any specific source. It should be understood that the term "qualified" as used with reference to a bypass power source 128 has its conventional meaning in the context of uninterruptible power supply systems. That is, a bypass power source is qualified when the power it is providing is within acceptable limits of its nominal operating parameters, such as voltage, frequency and phase rotation.

In an effort to increase availability, a plurality of UPS modules 100 can be connected to a device called a static transfer switch 300 as shown in FIG. 3 controlled by a control unit 302. Static transfer switch 300 switches a load 308 coupled to an output of static transfer switch 300 among one or more of the UPS modules 100 coupled to static transfer switch 300. This arrangement is referred to herein as multiple UPS system 304. In this arrangement, one of UPS modules 100 (referred to herein as UPS 1A) would be the sync master and its control unit 108 would send out a synchronization signal on a synchronization line 305 of a synchronization bus 306 to the control unit 108 of a slave UPS module 100 (referred to herein as UPS 1B). The output of inverter 104 of UPS 1B is be controlled by the control unit 108 of UPS 1B to be synchronized with the output of UPS 1A. That is, control unit 108 of UPS 1B controls the inverter 104 of UPS 1B so that the output voltage of inverter 104 of UPS 1B is in phase with the output voltage of UPS 1A. The bypass power source 128 for UPS 1A is referred to herein as bypass power source 128A and the bypass power source 128 for UPS 1B is referred to herein as bypass power source 128B.

If the synch master UPS module 100 (UPS 1A) loses its bypass power source 128A, it would go into a free run mode, but the slave UPS module 100 (UPS 1B) would still follow the output of UPS 1A. The result would be that UPS 1B would not be in sync with its bypass power source 128B and hence could not transfer to the bypass power source 128B if need be. FIG. 4 shows UPS 1B being out of phase with respect to the bypass power source 128B for UPS 1B.

SUMMARY

This section provides a general summary of the disclosure, and is not a comprehensive disclosure of its full scope or all of its features.

In accordance with an aspect of the present disclosure, a multiple uninterruptible power supply system includes at least two uninterruptible power supply modules, each uninterruptible power supply module having a control unit. The multiple uninterruptible power supply system also includes a static transfer switch to which each uninterruptible power supply module is coupled. A synchronization bus having a synchronization line couples the control units of each uninterruptible power supply module. The uninterruptible power supply module are synchronized to each other with one of the uninterruptible power supply modules being operated as a sync master UPS and its control unit sending synchronization signals on the synchronization bus that are received on the synchronization bus by control units of each of the other uninterruptible power supply module which are each operated as a slave UPS. When a bypass power source for the uninterruptible power supply module that is being operated as the sync master becomes unqualified, another one of the UPS modules is operated as the sync master and its control unit then sends out the synchronization signals.

In accordance with an aspect of the present disclosure, the synchronization signals are sent to a control unit of the static transfer switch. When the control unit of the static transfer switch detects based on the synchronization signals that a UPS module that was being operated as a slave UPS has switched over to be operated as the sync master UPS, the control unit of the static transfer switches a load coupled to the static transfer switch over to the UPS module that switched over to be operated as the sync master UPS.

Further areas of applicability will become apparent from the description provided herein. The description and specific examples in this summary are intended for purposes of illustration only and are not intended to limit the scope of the present disclosure.

DRAWINGS

The drawings are for illustrative purposes only of selected embodiments and not all possible implementations, and are not intended to limit the scope of the present disclosure.

Corresponding reference designations indicate corresponding parts throughout the several views of the drawings.

Figure 1:
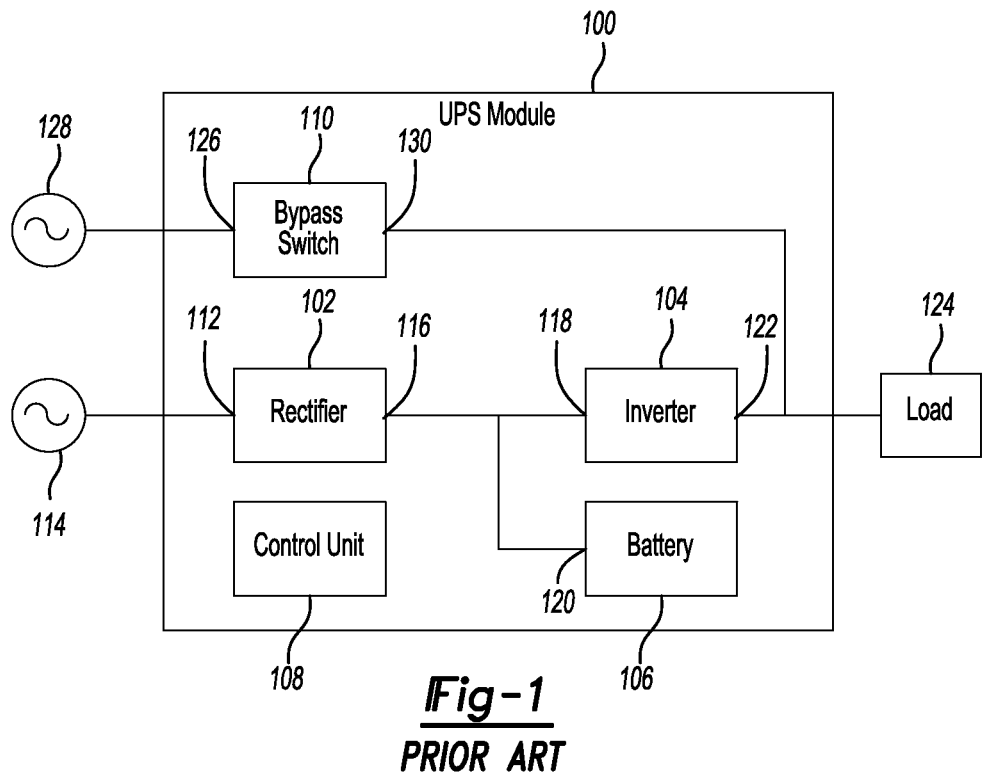
FIG. 1 is block diagram of a typical prior art uninterruptible power supply system having a single uninterruptible power supply module.
Figure 2:
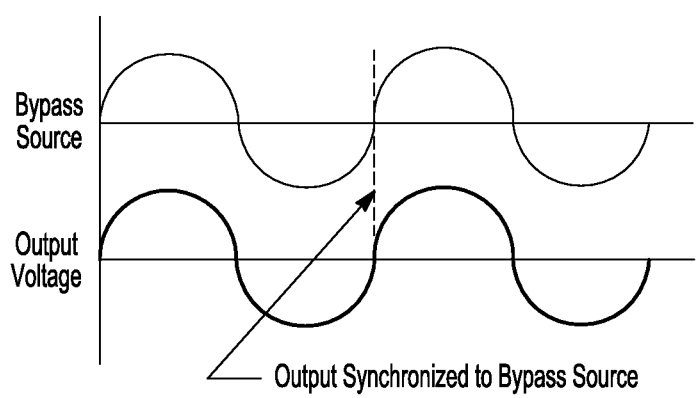
FIG. 2 is graph showing an output of the uninterruptible power supply module of FIG. 1 synchronized to a bypass power source to which the uninterruptible power supply module is coupled.
Figure 3:
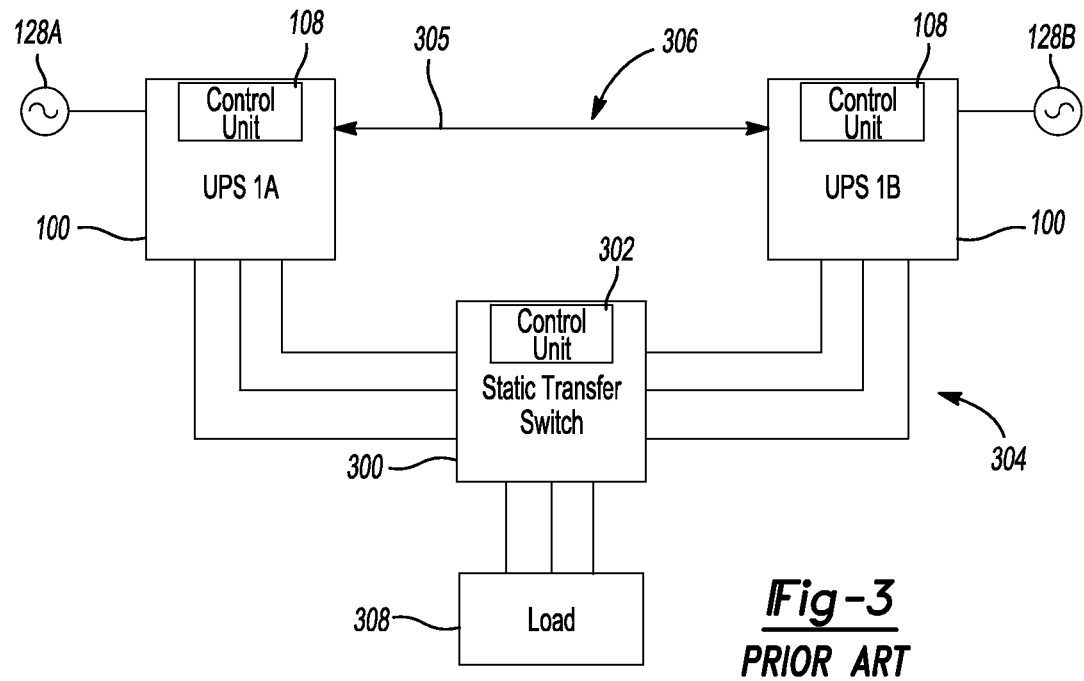
FIG. 3 is a block diagram of a typical prior art uninterruptible power supply system having two uninterruptible power supply modules coupled to a static transfer switch with one of the uninterruptible power supply modules being operated as a slave UPS having its output synchronized to an output of the other uninterruptible power supply module being operated as a sync master UPS.
Figure 4:
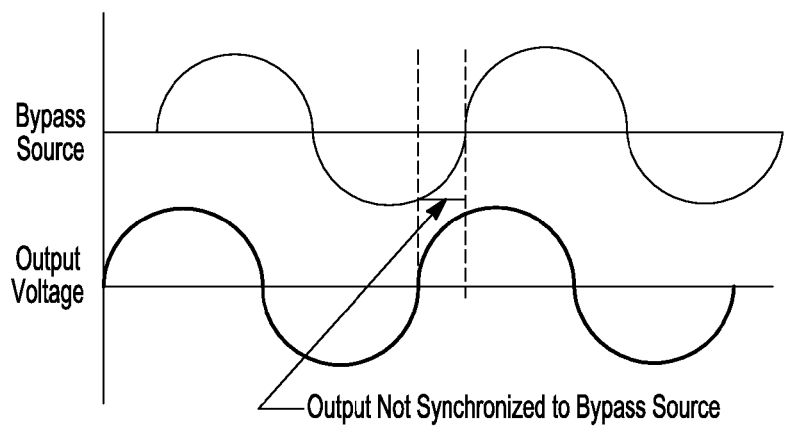
FIG. 4 is graph showing the output of the uninterruptible power supply module of FIG. 3 being operated as a slave UPS not synchronized with a bypass power source to which that uninterruptible power supply module is coupled.
Figure 5:
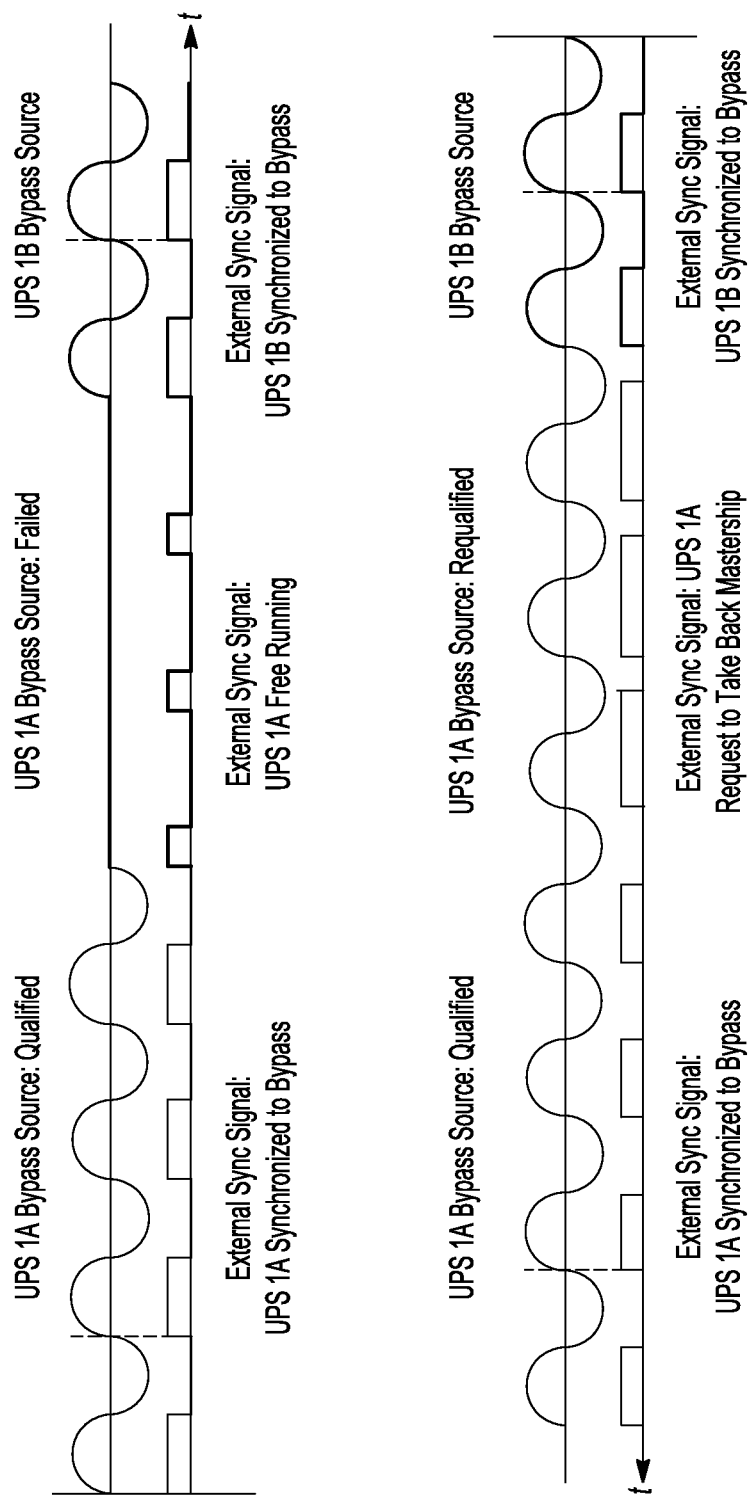
Figure 8:
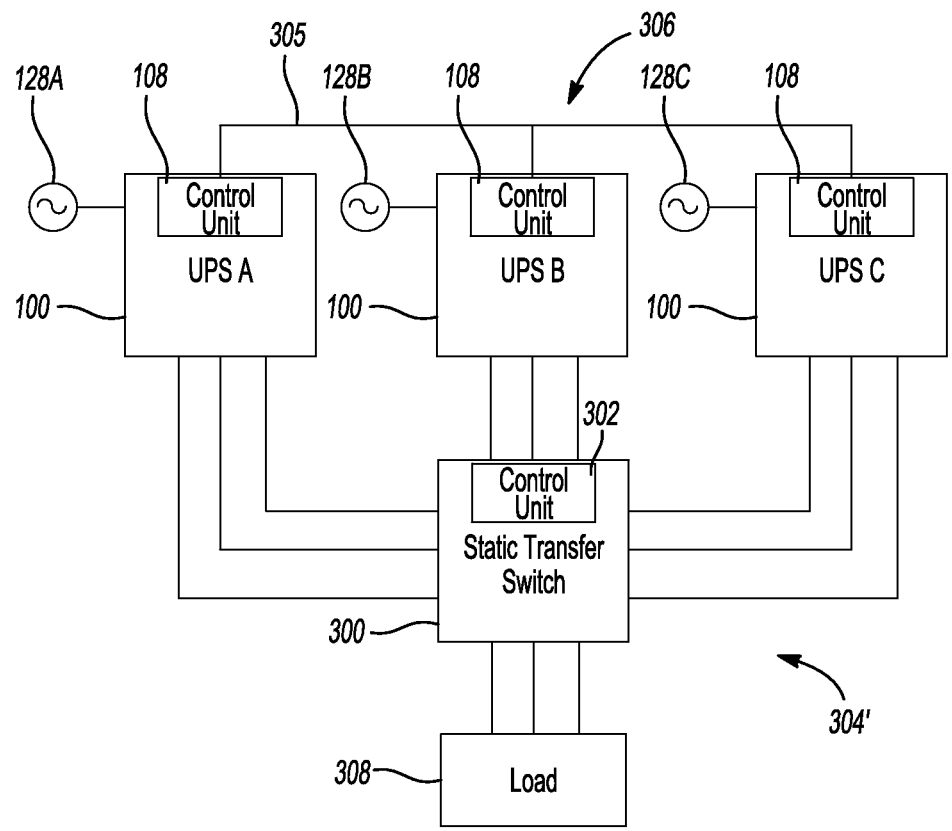
Figure 9:
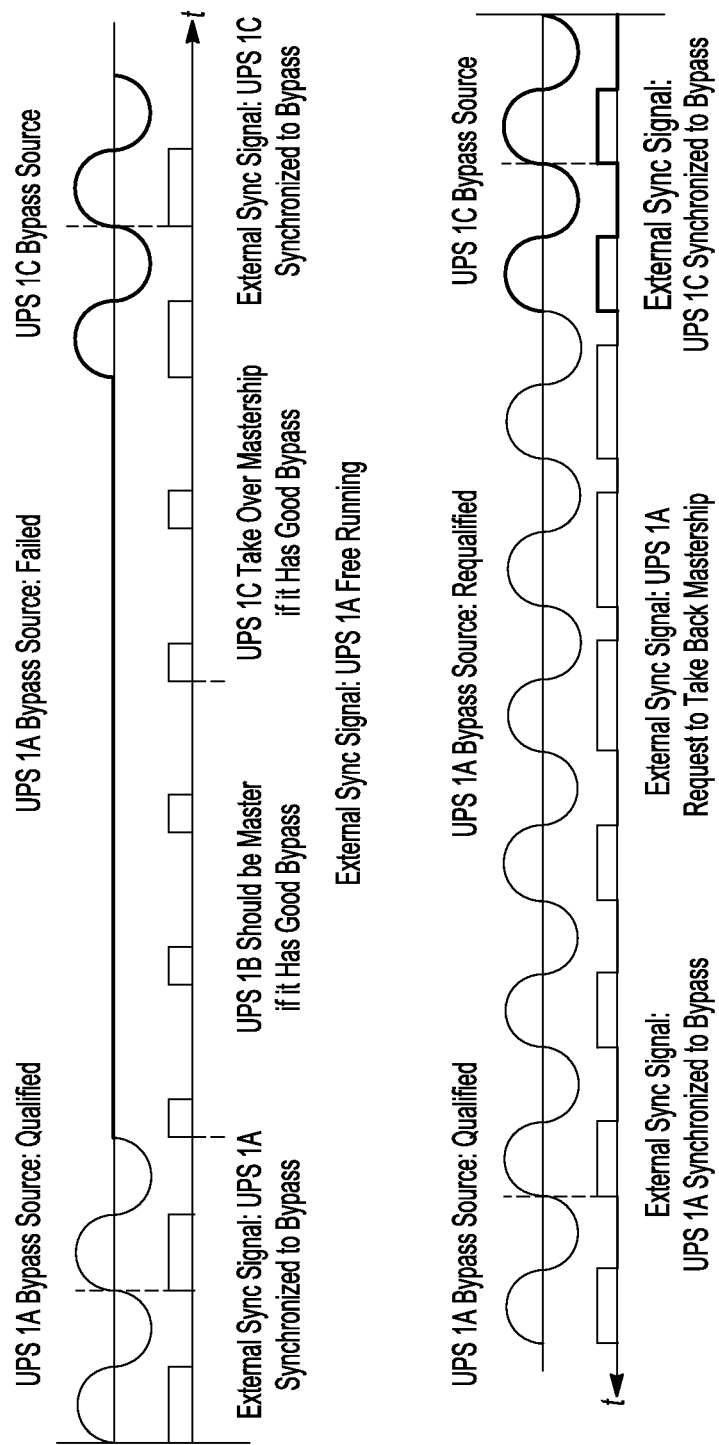
Figure 10:
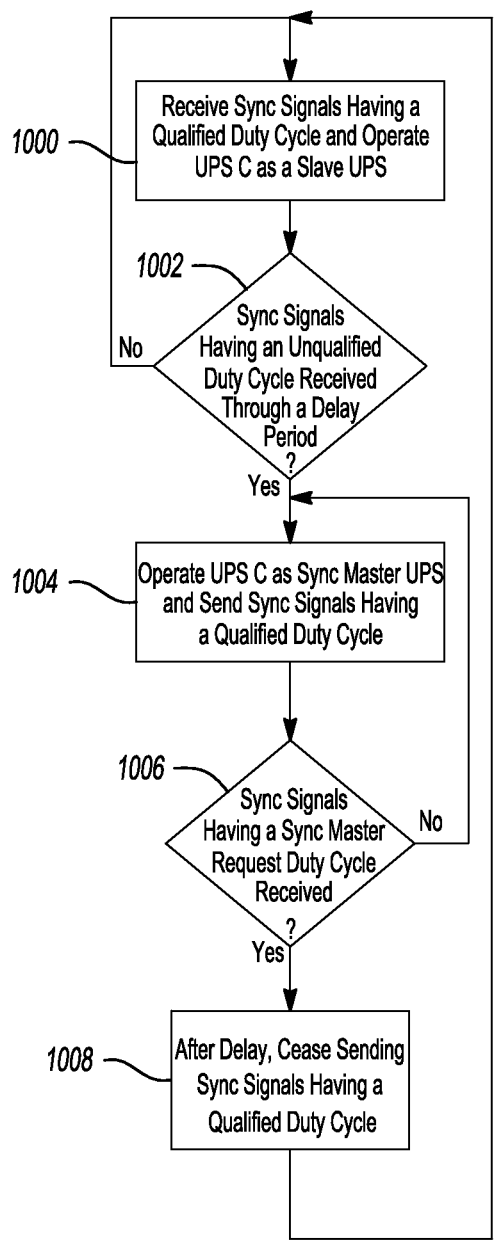
Figure 11:
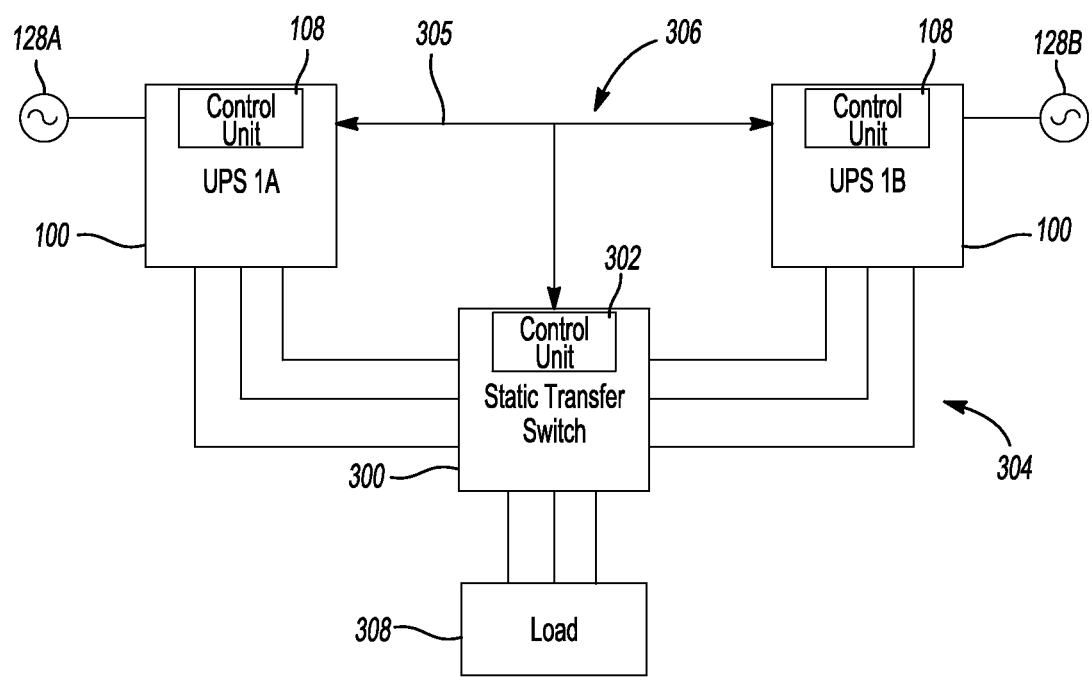

FIG. 5 is a logic timing diagram in accordance with an aspect of the present disclosure showing a process in a multiple uninterruptible power supply system of the switch in sync master from an uninterruptible power supply module initially being operated as a synch master UPS to an uninterruptible power supply being operated as a slave UPS when a bypass power source to which the uninterruptible power supply module initially being operated as the sync master becomes unqualified;

FIG. 6 is a flow chart of logic of FIG. 5 for the control of the uninterruptible power supply module initially being operated as a sync master UPS;

FIG. 7 is a flow chart of logic of FIG. 5 for the control of the uninterruptible power supply module initially being operated as a slave master UPS;

FIG. 8 is a block diagram of a typical prior art uninterruptible power supply system having at three uninterruptible power supply modules coupled to a static transfer switch with two of the uninterruptible power supply modules being operated as a slave UPS having their outputs synchronized to an output of the other uninterruptible power supply module being operated as a sync master UPS;

FIG. 9 is a logic timing diagram in accordance with an aspect of the present disclosure showing a process in a multiple uninterruptible power supply system of the switch in sync master to the third uninterruptible power supply module of FIG. 8;

FIG. 10 is a flow chart of the logic of FIG. 9 for the control of the third uninterruptible power supply module of FIG. 8;

FIG. 11 is a block diagram of the multiple uninterruptible power supply system of FIG. 3 modified in accordance with an aspect of the present disclosure to have a synchronization bus coupled to a control unit of the static transfer switch in addition to control units of the uninterruptible power supply modules.

DETAILED DESCRIPTION

Example embodiments will now be described more fully with reference to the accompanying drawings.

In accordance with an aspect of the present disclosure, a method of synchronizing UPS modules 100 in a multiple UPS system 304 is described. The multiple UPS system 304 includes UPS 1A, UPS 1B and static transfer switch 300, as discussed above. UPS 1A and UPS 1B are each a UPS module 100 and can each be operated as a sync master UPS and as a slave UPS with its output synchronized to an output of the sync master UPS. UPS 1A is operated as an initial sync master UPS and UPS B is operated as a slave UPS with its output synchronized to the output of UPS 1A. In accordance with an aspect of the method of the present disclosure, when the bypass power source for UPS 1A becomes unqualified, UPS 1B is transitioned to be operated as a substitute sync master UPS and UPS 1A is transitioned to be operated as a slave UPS. When this occurs, the control unit 108 of UPS 1B drives the synchronization signal and UPS 1A follows UPS 1B. The synchronization signal may illustratively be a square wave signal having a duty cycle. This keeps the outputs of the UPS modules 100 synchronized as before, but it also ensures that at least one UPS module 100 is also synchronized to a bypass power source. Therefore if something happened that required the multiple UPS system 304 to shutdown, the load could be transferred to bypass power.

The control unit 108 in UPS 1A is continuously generating the synchronization signals and the control unit 108 in UPS 1B is continuously reading the synchronization signals send out by the control unit 108 of UPS 1A. The control unit 108 of UPS 1B is constantly monitoring the synchronization signals by detecting the rising edge and falling edge of the signals. By calculating the time difference between the two rising edges and the time difference between one rising edge and the falling edge right after the previous rising edge, the control unit 108 of UPS 1B determines the duty cycle of the synchronization signals as shown in Equation 1. A similar calculation is used by the control unit 108 of UPS 1A to determine when to send a rising edge and when to send a falling edge. Once the duty cycle of the synchronization signal is determined, the control unit 108 of UPS 1B will know when to switch to be a master or slave.

Signal Duty Cycle Calculation     Equation 1

$$dutycycle\% = \frac{T_{fallingedge}(k) - T_{risingedge}(k)}{T_{risingedge}(k) - T_{risingedge}(k-1)} * 100\%$$

When the bypass power source 128A for UPS 1A is qualified, the synchronization signals sent out by the control unit 108 of UPS 1A on synchronization bus 306 are at a qualified duty cycle, which is a fixed duty cycle such as 50%. If the bypass power source 128A for UPS 1A fails (that is, it is no longer qualified), the duty cycle of synchronization signals sent out by the control unit 108 of UPS 1A are changed to have an unqualified duty cycle, which is a fixed duty cycle that is different than the qualified duty cycle, and may for example be a 25% duty cycle. In the following discussion, 50% is used as the qualified duty cycle and 25% is used as the unqualified duty cycle. It should be understood that the qualified duty cycle can be other than 50% and the unqualified duty cycle can be other than 25%.

When the control unit 108 of UPS 1B receives 25% duty cycle synchronization signals from the control unit of UPS 1A, the control unit 108 of UPS 1B knows that UPS 1A lost its bypass power source 128A and the control unit 108 of UPS 1B will transition UPS 1B to be operated as a substitute sync master. In doing so, the control unit 108 of UPS 1B will start sending synchronization signals on the synchronization bus 306 that have the qualified duty cycle, such as 50%, starting with a synchronization pulse having the 50% duty cycle. The synchronization bus 306 is configured so that the synchronization signals having highest duty cycle are passed through and any synchronization signals having lower duty cycles are not. That is, the synchronization signals having the highest duty cycle are passed through on the synchronization bus 306 from the control unit sending the synchronization signals to the control units of the other UPS modules and any synchronization signals at a lower duty cycle that are sent by any of the control units of the other UPS modules are not passed through from the control unit sending them to the other units of the other UPS modules.

The control unit of UPS 1A will then be receiving the 50% duty cycle synchronization signals sent by the control unit 108 of UPS 1B and the control unit 108 of UPS 1A will know that UPS 1B is trying to become the substitute sync master, usually upon receiving the initial synchronization pulse having the 50% duty cycle. Since UPS 1A lost its source of bypass power and the control unit of UPS 1A receives the 50% duty cycle synchronization signals from UPS 1B, UPS 1A will give up sync mastership (cease being the sync master UPS). The control unit 108 of UPS 1A will then stop sending the 25% duty cycle synchronization signals and will then operate UPS 1A as a slave UPS and start to follow the 50% duty cycle synchronization signals from the control unit 108 of UPS 1B.

When the bypass power source 128A for UPS 1A (the initial sync master UPS now be operated as a slave UPS as described above) is re-qualified, the control unit 108 of UPS 1A will then send synchronization signals having a sync master request duty cycle on the synchronization bus 306 to notify the control unit 108 of UPS 1B (the substitute sync master as described above) that UPS 1A wants to take back sync mastership. The sync master request duty cycle is higher than the qualified duty cycle and the unqualified duty cycle, and may for example be a 75% duty cycle. It should be understood that the sync master request duty cycle can be other than 75%.

Control unit 108 of UPS 1B will then be receiving the 75% duty cycle synchronization signals. Since control unit 108 of UPS 1B knows that it is sending 50% duty cycle synchronization signals, it then knows that the 75% duty cycle synchronization signals must be from the control unit 108 of UPS 1A which wants to take back sync mastership. After some delay, the control unit 108 of UPS 1B stops sending the 50% duty cycle synchronization signals and lets UPS 1A become the sync master. After a longer delay, the control unit 108 of UPS 1A will change to send 50% duty cycle synchronization signals to return to normal operation status with UPS 1A being operated by its control unit 108 as the sync master UPS.

It should be understood that the synchronization bus 306 could be configured to pass the synchronization signals having the lowest duty cycle instead of the highest duty cycle. In that case, the sync master request duty cycle would have the lowest duty cycle, the unqualified duty cycle would then have the highest duty and the qualified duty cycle would fall between the sync master duty cycle and the unqualified duty cycle.

FIG. 5 shows the process of the switch in synch master from UPS 1A to UPS 1B when the bypass power source 128A for UPS 1A becomes unqualified and then when UPS 1A takes back synch mastership when the bypass power source 128A for UPS 1A is re-qualified. The logic shown in FIG. 5 is illustratively implemented in the control units 108 of UPS 1A and UPS1B, such as in software, and FIGS. 6 and 7 are a flow chart of this logic. FIG. 6 shows the logic implemented in control unit 108 of UPS 1A and FIG. 7 shows the logic implemented in control unit 108 of UPS 1B.

With reference to FIGS. 6 and 7, at 600 UPS A is operated by its control unit 108 as the sync master UPS and control unit 108 of UPS A sends sync signals on the synchronization bus 306 at the qualified duty cycle. At 700, control unit 108 of UPS B receives the synchronization signals on the synchronization bus 306 having the qualified duty cycle and operates UPS B as a slave UPS. At 602, control unit 602 checks whether bypass power source 128 to which UPS A is coupled has become unqualified. If it hasn't, control unit 108 branches back to 600. If this bypass power source 128 has become unqualified, control unit 108 branches to 604 where it begins sending synchronization signals having the unqualified duty cycle on the synchronization bus 306. At 702, the control unit 108 of UPS B checks whether it is receiving synchronization signals on the synchronization bus 306 having the unqualified duty cycle. If not, control unit 108 of UPS B branches back to 700. If control unit 108 of UPS B is receiving synchronization signals having the unqualified duty cycle, control unit 108 of UPS B branches to 704 where it operates UPS B as the sync master UPS and begins sending synchronization signals having the qualified duty cycle on the synchronization bus 306.

At 606, control unit 108 of UPS A checks whether it has begun receiving synchronization signals on the synchronization bus 306 at the qualified duty cycle. If not, control unit 108 of UPS A branches back to 604. If control unit 108 of UPS A has begun receiving synchronization signals on the synchronization bus 306, it branches to 608 where it operates UPS A as a slave UPS and ceases sending synchronization signals on the synchronization bus 306 having the unqualified duty cycle, which also means that control unit 108 of UPS A has ceased sending any synchronization signals on the synchronization bus 306.

At 610, control unit 108 of UPS A checks whether bypass power source 128A for UPS A has become re-qualified. If not, control unit 108 of UPS A branches back to 608. If bypass power source 128A has become re-qualified, control unit 108 of UPS A branches to 612 where it begins sending synchronization signals having the sync master request duty cycle on the synchronization bus 306. Control unit 108 of UPS A then proceeds to 614 where after a delay (referred to herein as the "first delay"), it ceases sending synchronization signals on the synchronization bus 306 having the sync master request duty cycle and then branches back to 600 where it resumes operating UPS A as the sync master UPS. At 706, control unit 108 of UPS B checks whether it has begun receiving synchronization signals on the synchronization bus 306 having the sync master request duty cycle. If not, control unit 108 of UPS B branches back to 704. If control unit 108 of UPS B has begun receiving synchronization signals on the synchronization bus 306 having the sync master request duty cycle, control unit 108 of UPS B branches to 708 where, after delay (referred to herein as the "second delay"), ceases sending synchronization signals on the synchronization bus 306 having the qualified duty cycle, which also means that control unit 108 of UPS B has ceased sending any synchronization signals on the synchronization bus 306. Control unit 108 of UPS B then branches back to 700 where it resumes operating UPS B as a slave UPS.

The same method works for a multiple UPS system having more than two UPS modules 100, such as a multiple UPS system 304' (FIG. 8) having a third UPS module 100, referred to herein as UPS 1C. During the synch mastership switch period discussed above, UPS 1C is always synchronized to the synchronization signal being sent by the control unit 108 of UPS 1A or UPS 1B (as the case may be) and UPS C doesn't need to be involved the process of switching synch mastership unless the bypass power source 128B for UPS 1B is also not qualified. In that case, UPS 1C will take over being the synch master instead of UPS 1B. FIG. 9 shows the process of the switch in sync master to UPS 1C when the bypass power sources 128A and 128B are both unqualified. The logic shown in FIG. 9 is illustratively implemented in the control units 108 of UPS 1A-UPS 1C, such as in software and FIG. 10 is a flow chart of the logic implemented in the control unit 108 of UPS 1C.

With reference to FIG. 10, at 1000, control unit 108 of UPS C receives the synchronization signals on the synchronization bus 306 and operates UPS C as a slave UPS. At 1002, control unit 108 of UPS B checks whether it has been receiving synchronization signals on the synchronization bus 306 having the unqualified duty cycle for a period of time referred to herein as the priority delay for UPS C. If not, control unit 108 of UPS C branches back to 1000. If control unit 108 of UPS C has been receiving synchronization signals having the unqualified duty cycle for the priority delay for UPS C, control unit 108 of UPS C branches to 1004 where it operates UPS C as the sync master UPS and begins sending synchronization signals having the qualified duty cycle on the synchronization bus 306. Assuming UPS B was being operated as the sync master UPS and UPS A was being operated as a slave UPS, control unit 108 of UPS B responds to receiving synchronization signals on the synchronization bus 306 at the synchronization duty cycle by ceasing sending any synchronization signals on the synchronization bus and then operating UPS B as a slave UPS, in the same manner as discussed above with respect to UPS A when UPS B has taken over as the sync master.

At 1006, control unit 108 of UPS C checks whether it has begun receiving synchronization signals on the synchronization bus 306 at the sync master request duty cycle. If not, control unit 108 of UPS C branches back to 1004. If control unit 108 of UPS C has begun receiving synchronization signals on the synchronization bus 306 at the sync master request duty cycle, control unit 108 of UPS C branches to 1008. At 1008, after a delay (which is the same as the first delay discussed above), control unit 108 of UPS C ceases sending synchronization signals on the synchronization bus having the qualified duty cycle which also means that control unit 108 of UPS A has ceased sending any synchronization signals on the synchronization bus 306. Control unit 108 of UPS C then branches back to 1000 where it resumes operating UPS C as a slave UPS.

The priority delay for UPS C subordinates UPS C in priority to UPS B in taking over as the sync master when the bypass power source 128A for UPS A becomes unqualified. If control unit 108 of UPS B begins operating UPS B as the sync master during the priority delay for UPS C, then the control unit 108 for UPS C will continue to operate UPS C as a slave UPS and not switch UPS C to take over as the sync master UPS. In this way, the priority of the UPS modules 100 in taking over as the sync master UPS is set by the length of their priority delays, with the priority delays for each being different periods. In this regard, the shorter the priority delay (which could be zero for UPS B) the higher the priority.

With reference to FIG. 11, in accordance with an aspect of the present disclosure, the synchronization signals are sent to a control unit 302 of the static transfer switch 300 so that the static transfer switch 300 automatically changes the preferred bypass power source 128. The control unit 302 detects based on the synchronization signals if UPS module 100 that was being operated as a slave UPS has switched over to be operated as the sync master UPS, meaning this UPS module 100 is following an alternate bypass power source (the bypass power source to which it is coupled) rather than following the an alternate bypass power source of the UPS module 100 that had been operated as the sync master UPS. If a UPS module that had been operated as a slave UPS has been switched to be operated as the sync master UPS, the static transfer switch 300 switches the load 308 over to that UPS module 100. This improves the availability of power to the load 308.

The control units 108 of the UPS modules 100 and the control unit 302 of the static transfer switch may be or include a digital processor (DSP) or microprocessor which are programmed with software implementing the above described methods. It should be understood that other logic devices can be used, such as a Field Programmable Gate Array (FPGA), a complex programmable logic device (CPLD), or application specific integrated circuit (ASIC).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multiple uninterruptible power supply system, comprising:

at least first and a second uninterruptible power supply modules coupled to a static transfer switch, each uninterruptible power supply module including a control unit that is configured to operate the uninterruptible power supply module, each control unit coupled to a synchronization bus wherein when a bypass power source to which the first uninterruptible power supply module is coupled is qualified, the first uninterruptible power supply module operated by its control unit as a sync master UPS and the second uninterruptible power supply module initially operated by its control unit as a slave UPS synchronized to an output of the sync master UPS by synchronizing an output of an inverter of the second uninterruptible power supply module with an output of the sync master UPS;

the control unit of the first uninterruptible power supply module when it is operating the first uninterruptible power supply module as the sync master UPS sending synchronization signals at a qualified duty cycle on the synchronization bus that are received by the control unit of the second uninterruptible power supply module;

upon the bypass power source to which the first uninterruptible power supply module is coupled becoming unqualified:

in response to the bypass power source becoming unqualified the control unit of the first uninterruptible power supply module sending synchronization signals at an unqualified duty cycle on the synchronization bus;

in response to receiving the synchronization signals at the unqualified duty cycle, the control unit of the second uninterruptible power supply module transitioning its operation of the second uninterruptible power supply module from operating the second uninterruptible power supply module as a slave UPS to operating the second uninterruptible power supply module as the sync master UPS and also sending synchronization signals at the qualified duty cycle on the synchronization bus;

in response to receiving the synchronization signals at the qualified duty cycle, the control unit of the first uninterruptible power supply module transitioning its operation of the first uninterruptible power supply module from operating the first uninterruptible power supply module as the sync master UPS to operating the first uninterruptible power supply module as a slave UPS and the control unit of the first uninterruptible power supply module also ceasing sending the synchronization signals at the unqualified duty cycle on the synchronization bus; and upon the bypass power source to which the first uninterruptible power supply module is coupled becoming re-qualified:

in response to the bypass power source becoming re-qualified the control unit of the first uninterruptible power supply module sending synchronization signals on the synchronization bus at a sync master request duty cycle and after a first delay, transitioning its operation of the first uninterruptible power supply module from operating it as a slave UPS to operating it as the sync master UPS and also then sending synchronization signals at the qualified duty cycle on the synchronization bus;

in response to receiving the synchronization signals at the sync master request duty cycle, the control unit of the second uninterruptible power supply module after a second delay which is shorter than the first delay transitioning its operation of the second uninterruptible power supply module from operating the second uninterruptible power supply module as the sync master UPS to operating the second uninterruptible power supply module as a slave UPS and then also ceasing sending the synchronization signals at the qualified duty cycle on the synchronization bus.

2. The system of claim 1, wherein the static transfer switch is coupled to the synchronization bus and a control unit of the static transfer switch receives the synchronization signals on the synchronization bus, the control unit of the static transfer switch detecting based on the synchronization signals if a UPS module that was being operated as a slave UPS has switched over to be operated as the sync master UPS and upon detecting that such a UPS module that was being operated as a slave UPS has been switched over to be operated as the sync master UPS, the control unit of the static transfer switch switching a load coupled to the static transfer switch over to the UPS module that switched over to being operated as the sync master UPS.

3. The system of claim 1, wherein the synchronization bus only passes synchronization signals having a lowest duty cycle, the sync master request duty cycle being lower than the qualified duty cycle and the qualified duty cycle being lower than the unqualified duty cycle.

4. The system of claim 1 and further including at least a third uninterruptible power supply module coupled to the static transfer switch, the third uninterruptible power supply module also including a control unit that when the bypass power source to which the first uninterruptible power supply module is coupled is qualified or a bypass power source to which the second uninterruptible power supply module is coupled is qualified operates the third uninterruptible power supply module as a slave UPS and synchronizing an output of an inverter of the third uninterruptible power supply module with an output of the sync master UPS; and wherein when the second uninterruptible power supply module is being operated as the sync master UPS and the bypass power source to which the second uninterruptible power supply module is coupled becomes unqualified, the control unit of the third uninterruptible power supply module transitioning its operation of the third uninterruptible power supply module from operating the third uninterruptible power supply module as a slave UPS to operating the third uninterruptible power supply module as the sync master UPS and the control unit of the second uninterruptible power supply module transitioning its operation of the second uninterruptible power supply module from operating the second uninterruptible power supply module as the sync master UPS to operating the second uninterruptible power supply module as a slave UPS.

5. In a multiple uninterruptible power supply system having at least first and a second uninterruptible power supply modules coupled to a static transfer switch, each uninterruptible power supply module including a control unit that is configured to operate the uninterruptible power supply module, each control unit coupled to a synchronization bus, a method of synchronizing the uninterruptible power supply modules, comprising:

operating the first uninterruptible power supply module with the control unit of the first uninterruptible power supply module and operating the second uninterruptible power supply module with the control unit of the second uninterruptible power supply module wherein, when a bypass power source to which the first uninterruptible power supply is coupled is qualified, operating the first uninterruptible power supply module as a sync master UPS and initially operating the second uninterruptible power supply module as a slave UPS synchronized to an output of the sync master UPS by synchronizing an output of an inverter of the second uninterruptible power supply module with an output of the sync master UPS;

having the control unit of the first uninterruptible power supply module when the first uninterruptible power supply module is being operated as the sync master UPS sending synchronization signals at a qualified duty cycle on the synchronization bus and receiving the synchronization signals on the synchronization bus with the control unit of the second uninterruptible power supply module;

wherein upon the bypass power source to which the first uninterruptible power supply module is coupled becoming unqualified:

having the control unit of the first uninterruptible power supply module in response to the bypass power source becoming unqualified send synchronization signals at an unqualified duty cycle on the synchronization bus;

having the control unit of the second uninterruptible power supply module in response to receiving the synchronization signals on the synchronization bus having the unqualified duty cycle transitioning operating the second uninterruptible power supply module from operating the second uninterruptible power supply module as a slave UPS to operating the second uninterruptible power supply module as the sync master UPS and also send synchronization signals at the qualified duty cycle on the synchronization bus;

having the control unit of the first uninterruptible power supply module in response to receiving the synchronization signals on the synchronization bus having the qualified duty cycle transitioning operating the first uninterruptible power supply module from operating the first uninterruptible power supply module as the sync master UPS to operating the first uninterruptible power supply module as a slave UPS and also cease sending the synchronization signals at the unqualified duty cycle on the synchronization bus; and upon the bypass power source to which the first uninterruptible power supply module is coupled becoming re-qualified:

having the control unit of the first uninterruptible power supply module in response to the bypass power source becoming re-qualified sending synchronization signals at a sync master request duty cycle on the synchronization bus and after a delay, transitioning operating the first uninterruptible power supply module from operating the first uninterruptible power supply module as a slave UPS to operating the first uninterruptible power supply module as the sync master UPS and also send synchronization signals at the qualified duty cycle on the synchronization bus; and having the control unit of the second uninterruptible power supply module in response to receiving the synchronization signals on the synchronization bus at the sync master request duty cycle transitioning operating the second uninterruptible power supply module from operating the second uninterruptible power supply module as the sync master UPS to operating the second uninterruptible power supply module as a slave UPS and also cease sending the synchronization signals at the qualified duty cycle on the synchronization bus.

6. The method of claim 5, wherein a control unit of the static transfer switch is coupled to the synchronization bus and the method further includes having the control unit of the static transfer switch receive the synchronization signals on the synchronization bus and having the control unit of the static transfer switch detecting based on the synchronization signals if a UPS module that was being operated as a slave UPS has switched over to being operated as the sync master UPS and having the control unit of the static transfer switch in response to detecting that such a UPS module that was being operated as a slave UPS has been switched over to be operated as the sync master UPS switching a load coupled to the static transfer switch over to the UPS module that switched over to being operated as the sync master UPS.

7. The method of claim 6 including having the synchronization bus passing only synchronization signals having a lowest duty cycle and having the sync master request duty cycle being lower than the qualified duty cycle and the qualified duty cycle being lower than the unqualified duty cycle.

8. The method of claim 5 wherein the multiple uninterruptible power supply further includes at least a third uninterruptible power supply module coupled to the static transfer switch, the third uninterruptible power supply module also including a control unit, the method including operating the third uninterruptible power supply module with the control unit of the third uninterruptible power supply module wherein when the bypass power source to which the first uninterruptible power supply module is coupled is qualified or a bypass power source to which the second uninterruptible power supply module is coupled is qualified operating the third uninterruptible power supply module as a slave UPS and synchronizing an output of an inverter of the third uninterruptible power supply module with an output of the sync master UPS; and wherein when the second uninterruptible power supply module is being operated as the sync master UPS and the bypass power source to which the second uninterruptible power supply module is coupled becomes unqualified, having the control unit of the third uninterruptible power supply module transitioning operating the third uninterruptible power supply module from operating the third uninterruptible power supply module as a slave UPS to operating the third uninterruptible power supply module as the sync master UPS and having the control unit of the second uninterruptible power supply module transitioning operating of the second uninterruptible power supply module from operating the second uninterruptible power supply module as the sync master UPS to operating the second uninterruptible power supply module as a slave UPS.

\* \* \* \* \*